United States Patent [19]

Varaprasad et al.

[11] Patent Number: 5,151,816

[45] Date of Patent: Sep. 29, 1992

[54] METHOD FOR REDUCING CURRENT LEAKAGE AND ENHANCING UV STABILITY IN ELECTROCHEMICHROMIC SOLUTIONS AND DEVICES

[75] Inventors: Desaraju V. Varaprasad; Hamid R. Habibi; Niall R. Lynam; Padma Desaraju, all of Holland, Mich.

[73] Assignee: Donnelly Corporation, Holland, Mich.

[21] Appl. No.: 458,969

[22] Filed: Dec. 29, 1989

[51] Int. Cl.$^5$ .................................... G02F 1/01
[52] U.S. Cl. .................................... 359/275; 359/276; 359/265
[58] Field of Search ............... 350/357, 350 R, 354; 359/275, 276, 265

[56] References Cited

U.S. PATENT DOCUMENTS

| | | | |
|---|---|---|---|
| 2,633,045 | 3/1953 | Sziklai | 81/179 |
| 3,280,701 | 10/1966 | Donnelly et al. | 350/357 |
| 3,282,157 | 11/1966 | Jones et al. | 350/357 |
| 3,282,158 | 11/1966 | Jones et al. | 350/357 |
| 3,282,160 | 11/1966 | Jones et al. | 350/357 |
| 3,283,656 | 11/1966 | Jones et al. | 350/357 |
| 3,451,741 | 6/1969 | Manos | 350/357 |
| 3,453,038 | 7/1969 | Kissa et al. | 350/357 |
| 3,506,229 | 4/1971 | Schoot et al. | 350/357 |
| 3,652,149 | 3/1972 | Rogers | 350/357 |
| 3,692,388 | 9/1972 | Hall, Jr. et al. | 350/312 |
| 3,774,988 | 12/1983 | Rogers | 350/390 |
| 3,854,794 | 12/1974 | Van Dam et al. | 350/357 |
| 3,873,185 | 3/1975 | Rogers | 350/390 |
| 3,912,368 | 10/1975 | Ponjee et al. | 350/357 |
| 4,090,782 | 5/1978 | Bredfeldt et al. | 350/357 |
| 4,093,358 | 6/1978 | Shattuck et al. | 350/357 |
| 4,139,276 | 2/1979 | Clecak et al. | 350/357 |
| 4,210,390 | 7/1980 | Yaguchi | 350/357 |
| 4,309,082 | 1/1982 | Kohara et al. | 350/357 |
| 4,561,001 | 12/1986 | Gunn et al. | 350/357 |
| 4,684,219 | 8/1987 | Cox et al. | 350/357 |
| 4,750,817 | 6/1988 | Sammells | 350/357 |
| 4,752,119 | 6/1988 | Ueno et al. | 350/357 |
| 4,795,242 | 1/1989 | Wudl et al. | 350/357 |
| 4,893,908 | 1/1990 | Wolf et al. | 350/357 |

FOREIGN PATENT DOCUMENTS

| | | |
|---|---|---|
| 0012419 | 6/1980 | European Pat. Off. . |
| 0240226 | 10/1987 | European Pat. Off. . |
| 328017 | 5/1930 | United Kingdom . |
| 1314049 | 4/1973 | United Kingdom . |

OTHER PUBLICATIONS

Shelepin et al., "Electrochromism of Organic Compounds II. Spectral and Electrochemical Examination of a system Based on Methylviologen and 5,10-Dihydro-5,10-Dimethylphenazine," Elektrokhimiya, vol. 13(3), 404–408 (Mar. 1977).

Ushakov et al. , U.S. Hakov: "Electrochromis of Organic Compounds: Some Properties of Two-Electrode Cells," Elektrokimiya, vol. 14(2), 319-322 (Feb. 1978).

Hirai et al., "Electrochromism for Organic Materials in Polymeric All-Solid-State Systems," Appl. Phys. Lett., 43, (7), 704, 1983.

Kaufman "New Organic Materials for Use as Transducers in Electrochromic Display Devices," Conference Record of 1978 Biennial Display Research Conference, Oct. 24-26, 1978.

Primary Examiner—William Mintel
Assistant Examiner—Roy Potter
Attorney, Agent, or Firm—Price, Heneveld, Cooper, Dewitt & Litton

[57] ABSTRACT

The specification discloses a method for reducing current leakage and enhancing UV stability by using electrochemichromic solutions whose solvents include, either solely or in combination with other solvents, glutaronitrile (GNT).

31 Claims, 8 Drawing Sheets

FIG. 1 SOLAR SPECTRUM IN TUCSON ARIZONA

FIG. 3  HALF WAVE ITO

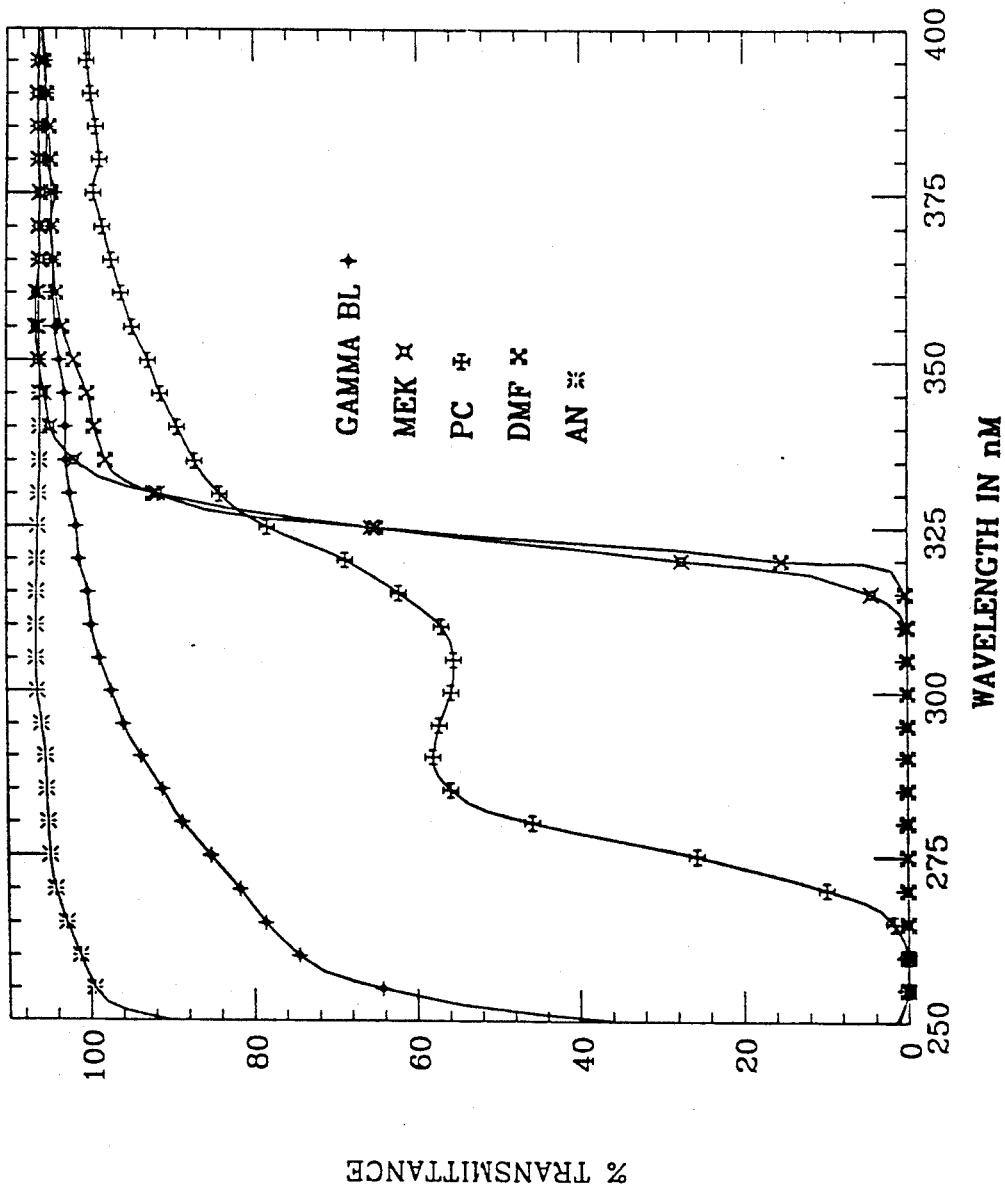
FIG. 8 PURE SOLVENTS

METHOD FOR REDUCING CURRENT LEAKAGE AND ENHANCING UV STABILITY IN ELECTROCHEMICHROMIC SOLUTIONS AND DEVICES

BACKGROUND OF THE INVENTION

The present invention relates to electrochemichromic solutions and devices based thereon. Such solutions are well-known and are designed to either color or clear, depending on desired application, under the influence of applied voltage.

Such devices have been suggested for use as rearview mirrors in automobiles such that in night driving conditions, application of a voltage would darken a solution contained in a cell incorporated into the mirror (U.S. Pat. No. 3,280,701, Oct. 25, 1966). Similarly, it has been suggested that windows incorporating such cells could be darkened to block out sunlight, and then allowed to lighten again at night. Electrochemichromic cells have been used as display devices and have been suggested for use as antidazzle and fog-penetrating devices in conjunction with motor vehicle headlamps (British Patent Specification 328017, May 15, 1930).

U.S. Pat. No. 4,090,782 to Bredfeldt et al., U.S. Pat. No. 4,752,119 to Ueno et al. (June 1988), Chemical Abstract 86:196871c, 72-Electro. Chemistry, Vol. 86, 1977, I. V. Shelepin et al. in *Electrokhimya*, 13(3), 404–408 (March 1977), O. A. Ushakov et al., *Electrokhimya*, 14(2), 319–322 (February 1978), U.S.S.R. Patent 566863 to Shelepin (August 1977), U.S. Pat. No. 3,451,741 to Manos, European Patent Publication 240,226 published Oct. 7, 1987 to Byker, U.S. Pat. No. 3,806,229 to Schoot et al., U.S. Pat. No. 4,093,358 to Shattuck et al., European Patent Publication 0012419 published Jun. 25, 1980 to Shattuck and U.S. Pat. No. 4,139,276 to Clecak et al. all disclose electrochemichromic solutions of anodic and cathodic electrochemically coloring components which provide self-erasing, high color contrast, single compartment cells. Such anodic and cathodic coloring components comprise redox couples selected to exhibit the following reaction:

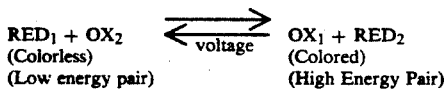

$$\text{RED}_1 + \text{OX}_2 \underset{\text{voltage}}{\rightleftarrows} \text{OX}_1 + \text{RED}_2$$
(Colorless) (Colored)
(Low energy pair) (High Energy Pair)

The redox couple is selected such that the equilibrium position of the mixture thereof lies completely to the left of the equation. At rest potential, the anodically coloring reductant species $\text{RED}_1$, and the cathodically coloring oxidant species $\text{OX}_2$ are colorless. To cause a color change, voltage is applied and the normally colorless $\text{RED}_1$ is anodically oxidized to its colored antipode $\text{OX}_1$, while, simultaneously, $\text{OX}_2$ is cathodically reduced to its colored antipode, $\text{RED}_2$. These cathodic/anodic reactions occur preferentially at the electrodes which, in practical devices, are typically transparent conductive electrodes. Within the bulk of the solution, the redox potentials are such that when $\text{RED}_2$ and $\text{OX}_1$ come together, they revert to their lower energy form.

This means the applied potential need only suffice to drive the above reaction to the right. On removing the potential, the system reverts to its low energy state and the cell spontaneously self-erases.

Such redox pairs are placed in solution in an inert solvent. Typically, an electrolyte is also added. This solution is then placed into a relatively thin cell, between two conductive surfaces. In most applications, at least one of the conductive surfaces comprises a very thin layer of a transparent conductor such as indium tin oxide (ITO), doped tin oxide or doped zinc oxide deposited on a glass substrate so that the cell is transparent from at least one side. If the device is to be used in a mirror, the second surface is typically defined by a relatively thin layer of transparent conductor such as indium tin oxide, doped tin oxide or doped zinc oxide deposited on another glass substrate, which is silvered or aluminized or otherwise reflector coated on its opposite side. In the case of solar control windows, the second glass substrate would of course not be silvered on its opposite side so that when the redox pair is colorless, the window would be entirely transparent.

A wide variety of cathodically coloring species, anodically coloring species, inert current carrying electrolytes and solvent systems are described in prior art. However, combinations of these suitable to meet the performance required for outdoor weathering, particularly for outdoor weathering of automobile rearview mirrors and automobile and architectural windows, have hitherto not been revealed. Nor have combinations been revealed that, in conjunction with possessing inherent UV stability, meet the temperature extremes required in commercial automotive and architectural applications. Nor have combinations been revealed that meet the UV resilience and temperature extremes required in automotive and architectural applications and that simultaneously have sufficiently low vapor pressures to facilitate use of a vacuum backfill technique to fill thin cells where the interpane spacing is very small. With higher vapor pressures, undesirable voids are left with the solution in the vacuum backfilled cell.

Vacuum backfilling has been used to fill liquid crystal displays. Liquid crystal displays are typically much smaller than the large areas of typical electrochemichromic devices such as mirrors and windows. Liquid crystal materials have inherently high viscosity and low vapor pressure. To fill with liquid crystal using the vacuum backfill technique, elevated temperatures are typically used so that the liquid crystal viscosity is sufficiently low that the material flows into and fills the cavity. Because of their inherent low vapor pressure even at elevated temperatures, voids are not a significant problem during backfilling with liquid crystals. The same is not true for many electrochemichromic solvents cited in the prior art.

Many of the organic solvents proposed in the prior art as solvents for electrochemichromic compounds have disadvantages when chosen for UV resilient devices. This is because commonly suggested solvents, such as acetonitrile, propylene carbonate, gamma-butyrolactone, methyl ethyl ketone, dimethylformamide and the like, are highly transmissive to UV radiation. Incoming UV radiation that is admitted by the ITO-coated glass substrate is unattenuated by the solvent and thus is capable of photolyzing or otherwise degrading any UV vulnerable solute in solution in that solvent.

Addition of UV stabilizers such as benzotriazoles, benzophenones, or hindered amine complexes, as known in prior art, can help increase solution stability to UV radiation, but there are limitations and disadvantages to addition of UV stabilizers. Because they are held in solutions of low to moderate viscosity, both the UV stabilizer and the electrochemichromic solutes are free to randomly move about in the solution. Thus, an incoming photon of UV radiation may impinge and thus degrade an electrochemichromic solute species rather than be absorbed by a UV absorber in solution. Also, solubility within the selected solvent places limits on the amount of UV stabilizer that can be added.

Solute solubility is also a factor in connection with the choice of solvents for electrochemichromic components. High solubility is preferred for the anodic and cathodic species as well as for electrolytes which are usually added to such solutions. Such electrolytes enhance cell performance and must be soluble in the solvent.

Yet another problem encountered in electrochemichromic devices related to current leakage. When the electrochemichromic cell is colored by the application of voltage, the colored species $OX_1$ and $RED_2$ continually want to recombine and return to their equilibrium, colorless condition. The rate of recombination of the colored species $OX_1$ and $RED_2$ within the bulk of the solution is directly proportional to their diffusion coefficient in the solvent used. In order to compensate for the tendency of the colored species to recombine and go to the colorless equilibrium state, current must continually leak into the electrochemichromic solution via the conductive electrodes that typically sandwich said solution.

Because current must flow across the conductive surface of the transparent conductor used on at least one of the substrates that sandwich the electrochemichromic cell, and because these transparent conductors have finite sheet resistance, applied potential will be highest adjacent to the bus bar connector typically located at an edge perimeter and will be lowest near the center of the device as current passes across the conductive glass surface to color remote regions. Thus, if the leakage current is high and/or the sheet resistance of the transparent conductor is high, the potential drop that ensues across the transparent conductor itself results in a lower potential being applied to remote regions. Coloration is therefore nonuniform with the edge regions nearest the bus bar coloring deepest and the central regions coloring lightest. Such nonuniformity in coloration is commercially undesirable. For a given transparent conductor sheet resistance, the lower the leakage current the more uniform the coloration. This is an important advantage; otherwise, a thicker and hence more costly and less transparent conductive coating would be needed to reduce the sheet resistance to accommodate the higher leakage currents seen with solvents suggested in the prior art.

Yet another disadvantage of higher leakage currents is their imposition of a drain on battery-power sources in some instances. If an electrochemichromic device were used in a sunroof, for example, it would be desirable to have the sunroof colored dark while the car is parked in a parking lot. If the current leakage is too great, the operator could find that the car battery has been drained as a result of current being drawn by the colored sunroof.

One further problem which plagues electrochemichromic devices is "segregation." When first bleached after being held for a prolonged period in the colored state, bands of color are seen adjacent to the bus bar connectors to the transparent conductive electrodes that sandwich the electrochemichromic solution. In electrochemichromic solutions revealed in prior art, various methods must be used to reduce segregation. These include thickening the electrochemichromic solution, use of low concentrations of electrochemichromically active species, and use of high concentrations of current-carrying electrolyte. The addition of thickeners will also reduce leakage current. One problem with adding thickeners is that the solution can become so viscous that vacuum backfilling a thin electrochemichromic cell becomes commercially unfeasible.

As a result of these drawbacks, electrochemichromic solutions and devices based thereon have not achieved the degree of commercial success which they potentially could achieve. Prior artisans have failed to relate these problems to the solvents used in electrochemichromic solutions, typically simply providing a laundry list of organic solvents without discrimination as to the impact of any one on solving such problems. Thus, U.S. Pat. No. 3,806,229 to Schoot provides a laundry list including glutarodinitrile (glutaronitrile), acetonitrile, propionitrile, benzonitrile, propylene carbonate, nitromethane and acetic acid anhydride with no appreciation for the peculiarities of any one solvent.

SUMMARY OF THE INVENTION

The present invention comprises the discovery that electrochemichromic solution and devices, based on the use of glutaronitrile (GNT) as the solvent, either alone or in combination with other solvents, show unexpectedly reduced current leakage and self-screening UV characteristics. Segregation is minimized without excessive solution viscosity increase and without the need for added thickeners.

These and other objects, advantages and features of the invention will be more fully understood and appreciated by reference to the written specification and appended drawings.

BRIEF DESCRIPTION OF THE DRAWINGS

FIG. 8 is a graph of the percent transmittance of solar radiation at various wavelengths by prior art solvents for electrochemichromic solutions.

DESCRIPTION OF THE PREFERRED EMBODIMENT

Introduction

The electrochemichromic solutions of the preferred embodiment can utilize conventional or equivalent redox systems such as the viologens combined with phenazines, diamines or benzidines, dissolved in glutaronitrile (GNT) or in a solvent comprising at least 25% by volume of glutaronitrile mixed with other solsolubility. These preferred embodiment viologen salts will be the subject of a copending U.S. patent application to be entitled ELECTROCHEMICHROMIC VIOLOGENS.

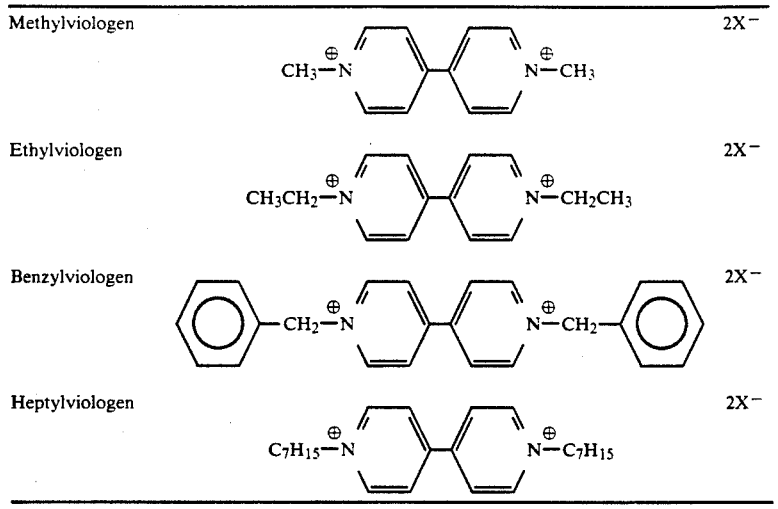

vents such as 3-hydroxypropionitrile (HPN), 3,3'-oxydipropionitrile (ODPN), 3-methylsulfolane (MS) and propylene carbonate (PC) and other solvents common to electrochemichromic devices. Electrolytes may optionally be used and are preferably used.

Viologens are preferred cathodic materials for the redox pair. Methylviologen, ethylviologen, benzylviologen and heptylviologen are all satisfactory, with a 0.025 molar solution of methylviologen being preferred.

Viologen counterions are listed below:

| | |
|---|---|
| Tetrafluoroborate | $BF_4^-$ |
| Perchlorate | $ClO_4^-$ |
| Trifluoromethane sulfonate | $CF_3SO_3^-$ |
| Hexafluorophosphate | $PF_6^-$ |
| Hexafluoroarsenate | $AsF_6^-$ | forth below:

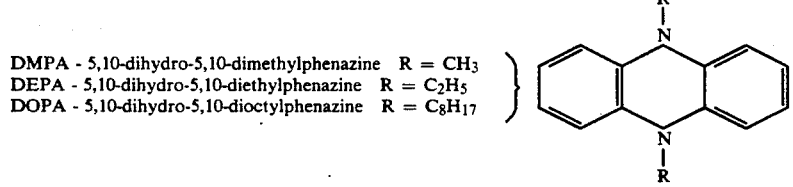

TMPD - N,N,N',N'-tetramethylphenylenediamine

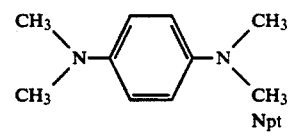

TMBZ - N,N,N',N'-tetramethylbenzidine

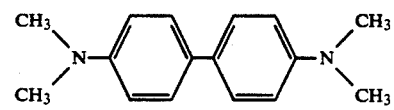

TTF - Tetrathiafulvalene

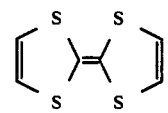

Higher concentrations up to the solubility limits are also operable. In the structural formulas set forth below, X⁻ represents the anion of the viologen salt. Various anions are disclosed in the literature, though we have discovered that the most preferred anions are hexafluorophosphate ($PF_6^-$) and hexafluoroarsenate ($AsF_6^-$) because they surprisingly enhances viologen Most preferred is a 0.025 molar solution of 5,10-dihydro-5,10-dimetylphenazine (DMPA).

Numerous electrolytes can be used in the present invention. One which is acceptable in accordance with the preferred embodiment of the invention is a tetrabutylammonium hexafluorophosphate. We prefer a 0.025 molar solution.

UV stabilizers such as Uvinul ™ 400 at approximately 5% weight by volume can also be used in the solutions of the present invention. As explained below, GNT surprisingly provides UV self-screening, but such UV stabilizers may additionally be used to enhance protection further.

The best mode electrochemichromic solution contemplated for practicing the invention comprises a solvent including at least about 25% GNT, containing 0.02 to 0.05 and most preferably 0.025 molar methylviologen hexafluorophosphate or methylviologen perchlorate, 0.02 to 0.05 and most preferably 0.025 molar tetrabutylammonium hexafluorophosphate or tetraethylammonium perchlorate, and 0.02 to 0.05 and most preferably 0.025 molar 5,10-dihydro-5,10-dimethylphenazine (DMPA).

Figure 2:
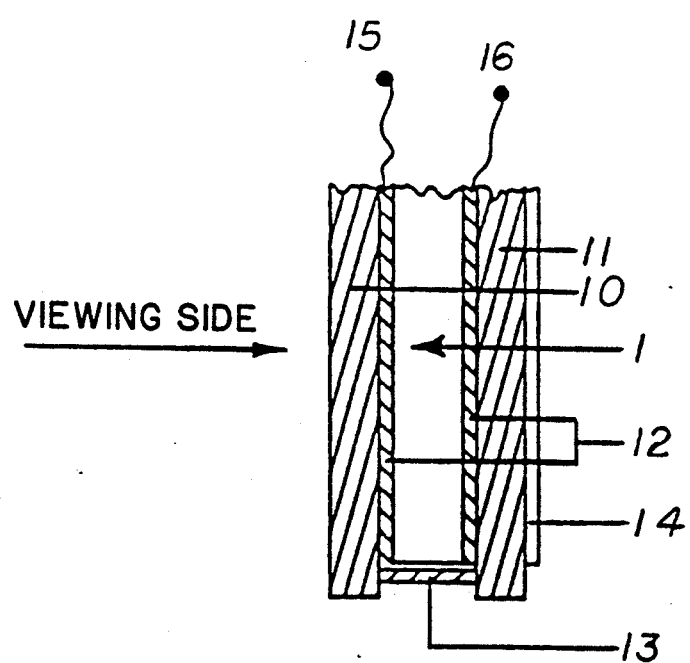
FIG. 2 is a cross-sectional view of an electrochemichromic cell.

FIG. 2 illustrates a typical electrochemichromic cell 1 into which solutions of the present invention are typically filled. Cell 1 comprises a pair of glass plates 10 and 11 each coated on its inwardly facing surface with a half wave indium tin oxide (ITO) coating 12 of about 15 ohms/square sheet resistance. Plates 10 and 11 are separated by peripheral seal 13 so that the interior of the cell has a thickness of 150 microns. Cell 1 is sealed at its perimeter by peripheral seal 13. Seal 13 comprises an epoxy material, to which 150 micron diameter spacers are added, and silk-screened to a thickness of about 150 microns. Glass beads are used as spacers. As shown, cell 1 is intended to be used as a mirror, and thus the rear surface of glass plate 11 is coated with a silver reflector layer 14. If the device were used as a window, layer 14 would be deleted. The conductive indium tin oxide layers 12 are connected to electrical terminals 15 and 16 so that a voltage can be established across a solution located between plates 10 and 11 in cell 1.

To vacuum backfill cell 1, a small gap is introduced into seal 13 at some extremity corner. This acts as a fill hole. Solution can be filled through this hole and once inside the cell, the solution is contained by seal 13 between glass substrates 10 and 11. It is desirable to use a small fill hole so that the entrance orifice is small. Otherwise, it is difficult to seal the fill hole once the cell cavity is full such that no leaks occur through the fill hole. But since the fill hole is small, less than 1 mm×1 „×150 microns typically, it is difficult to fill the cell cavity using a hypodermic needle or the like. Also, since there is only one fill hole, back pressure would impede complete filling through one fill hole anyway. Thus a means is needed to fill such a cell cavity that overcomes the above problems. Vacuum backfilling is such a means.

In the vacuum backfill technique, the empty cell is placed in a vacuum chamber along with a container (typically a dish or small cup) of the electrochemichromic fluid intended to be filled through the single fill hole into the cell cavity. The chamber is evacuated to a high vacuum, 1 mm Hg or better. Means are then used to lower the fill hole just under the surface of the electrochemichromic fluid. The chamber is now vented to atmospheric pressure (typically using nitrogen or similar inert gas). Atmospheric pressure forces the fluid into the cell cavity and so fills it. However, how completely it fills is a function both of the vacuum pressure upon evacuation $P_V$ and the atmospheric pressure $P_A$ to which the chamber is vented during venting.

Although a vacuum pump can evacuate a vacuum chamber to $10^{-6}$ mm Hg or better, the vapor pressure of the solvent limits how high a vacuum can be achieved. This is because the vacuum pump reduces the vacuum pressure down to the vapor pressure (at the temperature of the chamber) of the fluid used. Once the vacuum pressure equals the vapor pressure, vacuum pressure will go no lower until all the fluids have evaporated. Thus the choice of solvent, through its vapor pressure, dictates how large a bubble will remain after backfilling a given cell volume. As the device area increases such as might be encountered in window devices, the problem gets worse and, unless a sufficiently low vapor pressure solvent is chosen, or unless means such as cooling the fluid and chamber (to reduce vapor pressure) or overpressuring during backfill (to force more fluid in) are employed, a cosmetically unacceptable bubble will be left within the electrochemichromic cell. While a small bubble of about 1 mm diameter may dissolve over time, a larger bubble will not completely disappear. Further, if the viscosity of the fluid to be filled is very high, then it may be difficult to fill at room temperature. If higher filling temperatures are used, the residual bubble may be larger as the vapor pressure increases with temperature. Simple physics teaches that:

$$P_A V_A = P_V V_V \tag{1}$$

where
$P_A$ = pressure to which the chamber is finally vented.
$V_A$ = volume of gas trapped in the cell after completely filling the cell.
$P_V$ = vacuum pressure in the chamber after evacuation and prior to filling.
$V_V$ = volume of the empty cavity, i.e., cell volume.

Since undissolved gas trapped in the cell after incomplete filling will usually form a bubble, then $V_A$ can be written as:

$$V_A = \pi/4 \, d^2 t \tag{2}$$

where
d is the bubble diameter; and
t is the cell cavity thickness.

Also, $P_A$ is usually 760 mm Hg although it is important to stress that the chamber can be overpressured to several atmospheres or more after filling if it is desired to fill more completely. However, in the case where $P_A = 760$ mm Hg and where $V_V = A \times t$ where A is the cell area and t is the interpene thickness, we have:

$$P_V \cdot A \cdot t = 760 \cdot \pi/4 \cdot d^2 \cdot t \tag{3}$$

which reduces to $$P_V = 5.969 \, d^2/A \tag{4}$$

where d is in mm and A is in cm²
Likewise $$d = \sqrt{(P_V \times A)/5.969} \tag{5}$$

Equation (4) expresses the relationship between the residual gas bubble diameter d (in mm) and the cell area (in cm²) to the pressure in the chamber, $P_V$, prior to venting to atmosphere and thus backfilling.

Note that if two solvents or more are mixed together to form an ideal solution, the vapor pressure of the solution is simply the sum of the vapor pressures of each component. The solvent GNT taught in this invention has a very low vapor pressure, so that its an excellent choice for use as a solvent component in electrochemichromic solutions intended to be vacuum backfilled. This is particularly important when large area devices such as 1 m² windows where the volume of cell cavity can be as large as 150 cc or thereabouts. By contrast, many of the prior art solvents, such as acetonitrile, methyl ethyl ketone, and dimethylformamide are unsuitable choices, even for use as components in solvent mixtures. Also, note that the solutions used as electrochemichromic fluids are sufficiently dilute for the various solutes (anodic/cathodic compounds, electrolyte, etc.) not to significantly depress vapor pressures.

Lower boiling point solvents such as acetonitrile, dimethylformamide and methyl ethyl ketone tend to have relatively high vapor pressures at room temperature. Thus, the higher boiling point GNT solvent of the present invention, which has a lower vapor pressure at room temperature, is significantly more suitable for the vacuum backfilling technique described herein. It tends to leave smaller bubbles in the filled cell.

The Experimental Data

Tables 1, 2 And 3

Table 1 compares the solvent of the present invention to three conventionally suggested prior art electrochemichromic solvents: propylene carbonate, gamma butyrolactone and dimethylformamide. The first and second columns report boiling point and freezing point for the various solvents, including that of the present invention. The third column indicates the appearance of electrochemichromic solutions at zero applied potential made in accordance with the present invention in an electrochemichromic cell.

Electrochemichromic cell 1 (FIG. 2) was used for the data contained in the third column of Table 1 and the data in Table 2. Cell area was about 110 cm² and thickness was about 150 microns. Sheet resistance of the ITO transparent conductors used in the cell was 15 ohms per square. For Table 2, the cells were powered to 1 volt. Each cell was filled with a solution of the indicated solvent or solvent combination, containing 0.025 molar methylviologen perchlorate, 0.025 molar 5,10-dihydro 5,10-dimethylphenazine and 0.025 molar tetraethylammonium perchlorate unless otherwise indicated in the Table. Conventional techniques were used to ensure the solutions were oxygen free and were anhydrous. Table 2 compares electrochemichromic solutions which are identical in all respects, except that different solvents are used. Propylene carbonate (PC), gammabutyrolactone (GBL), dimethylformamide (DMF) and acetonitrile (AN), conventional solvents, are compared to glutaronitrile (GNT) and to mixtures of GNT with 3-hydroxypropionitrile (HPN), 3,3'-oxydipropionitrile (ODPN), 3-methylsulfolane (MS) and propylene carbonate (PC).

The first four data columns of Table 2 report reflectivity data. Reflectivity is measured in a conventional manner using standard illuminant A and a photodetector that reproduces the eye's photopic response and is expressed as a percentage of incident light which is reflected by the mirror. The first data column discloses the high percentage reflectivity as measured when the electrochemichromic solution is at zero potential and thus is colorless. The second column measures the low percent reflectivity, which is determined when the electrochemichromic solution is colored at 1 volt applied potential.

The third column measures the time in seconds that it takes for the solution to color from 70% reflectivity to 20% reflectivity. The fourth column indicates in seconds the time it takes for the solution to bleach from 10% reflectivity to 60% reflectivity. The fifth column of Table 2 measures current leakage for the fully colored solution presented in amperes per square meter.

Table 3 discloses the solubility of various UV stabilizers in the solvent of the present invention.

TABLE 1

| Solvent | Boiling Point | Freezing Point | Color In Cell |
|---|---|---|---|
| Propylene carbonate 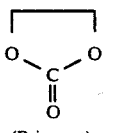 (PC) (Prior art) | 240° C. | −55° C. | Clear and Colorless |
| γ-Butyrolactone 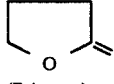 (γ-BL) (Prior art) | 205° C. | −45° C. | Clear and Colorless |
| Dimethylformamide 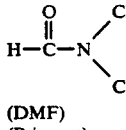 (DMF) (Prior art) | 153° C. | −61° C. | Clear and Colorless |
| Glutaronitrile (GNT) $NC(CH_2)_3CN$ | 286° C. | −29° C. | Clear and Colorless |

TABLE 2

| | HI % R | LOW % R | Color 70%–20% R Sec | Bleach 10%–60% R Sec | Leakage Current A/m² |
|---|---|---|---|---|---|
| PC (prior art) | 80.6 | 8.3 | 4.5 | 4.8 | 7.18 |
| GBL (prior art) | 78 | 15.1 | 7.1 | 3.4 | 5.6 |
| DMF (prior art) | 81.3 | 27.2 | 8.75 | 1.54 | 8.40 |
| *AN (prior art) | 81 | 43 | 1.5 | 1.5 | 9.8 |
| HPN | 81.5 | 7.5 | 3.7 | 5.43 | 6.76 |
| ODPN | 80.3 | 6.1 | 3.7 | >10 | 2.68 |
| ABL | 80.1 | 6.7 | 3.9 | 9.4 | 3.83 |
| MS | 81.5 | 7.4 | 5.0 | >10 | 1.54 |
| **MGNT | 80.2 | 7.6 | 4.5 | 9.34 | 3.1 |
| GNT | 78.5 | 7.1 | 3.5 | >10 | 3.59 |
| PC/GNT | | | | | |
| 75/25 | 81.4 | 8.05 | 4.63 | 5.36 | 5.71 |
| 50/50 | 80.5 | 6.2 | 3.65 | 7.35 | 5.33 |
| 25/75 | 81.3 | 6.95 | 4.30 | 7.43 | 4.64 |
| HPN/GNT | | | | | |
| 75/25 | 78.9 | 7.3 | 3.34 | 5.19 | 6.7 |
| 50/50 | 80.2 | 6.6 | 3.78 | 5.7 | 5.77 |
| 25/75 | 79.3 | 7.2 | 3.85 | 6.04 | 5.5 |
| GNT/MS | | | | | |
| 50/50 | 85.1 | 7.0 | 4.6 | 14.4 | 2.19 |
| GNT/ODPN | | | | | |

TABLE 2-continued

| | HI % R | LOW % R | Color 70%- 20% R Sec | Bleach 10%- 60% R Sec | Leakage Current A/m² |
|---|---|---|---|---|---|
| 50/50 | 84.5 | 6.6 | 4.7 | 10.97 | 2.9 |

*Counter ion is tetrafluoroborate instead of perchlorate
**Counter ion is hexafluorophosphate
AN = Acetonitrile
GBL = Gammabutyrolactone
PC = Propylene Carbonate
HPN = 3-Hydroxypropionitrile
ODPN = 3,3'-Oxydipropionitrile
MS = 3-methylsulfolane
DMF = Dimethylformamide
GNT = Glutaronitrile

TABLE 3

Solubility of UV stabilizers
All data is wt/vol % and at room temperature.

| | GNT |
|---|---|
| Tinuvin P ™ | 0.4 |
| Uvinul 400 ™ | 12.6 |
| Cyasorb 24 ™ | 15.5 |
| Uvinul N-539 ™ | 35.9 |

Tinuvin P ™ = 2-(2H-benzotriazole-2-yl)-4-methyphenyl
Ciba Geigy, Hawthorne, New York
Uvinul 400 ™ = 2,4-dihydroxy-benzophenone
BASF Wyandotte Corp., Wyandotte, MI
Cyasorb 24 ™ = 2,2'-dihydroxy-4-methoxybenzophenone
American Cyanamid Company, Wayne, NJ
Uvinul N-539 ™ = 2-ethylhexyl-2-cyano-3,3-diphenylacrylate
(Note: a liquid)
BASF Wyandotte, Wyandotte, MI
GNT = Glutaronitrile

Glutaronitrile

Glutaronitrile has a boiling point of 286° C. and hence can withstand the high temperatures which can be generated by a mirror or the like sitting in the sun (Table 1). Similarly, it has a freezing point of −29° C. and thus will not freeze in cold winter weather. Electrolytes show excellent solubility, i.e., greater than 0.05 molar. The solutions are clear in an electrochemichromic cell.

UV stabilizers, like the electrolytes, also show excellent solubility in GNT. This makes it possible to enhance UV stability of GNT electrochemichromic solutions.

GNT electrochemichromic solutions exhibit a high percentage reflectivity in their bleached condition (78.5% Table 2). Similarly, their reflectivity when colored is low, i.e., 7.1%. GNT solutions also tend to color fast (3.5 seconds), and they bleach satisfactorily.

One of the most important advantages of GNT solutions over prior art solutions such as propylene carbonate solutions in their lower current leakage. The GNT solution of Table 2 exhibits leakage of 3.59 amperes per square meter versus 7.18 amperes per square meter for a comparable propylene carbonate solution (Table 2) or 9.8 amperes per square meter for a comparable acetonitrile solution (Table 2).

Solvent Mixtures

The Table 2 data demonstrates that the solvent of the present invention, glutaronitrile, also works well in combination with other solvents. Some such solvents are prior art solvents. Others such as HPBN, ODPN and MS are U.S. patent application Ser. No. 07/443,113 entitled HIGH PERFORMANCE ELECTROCHEMICHROMIC SOLUTIONS AND DEVICES THEREOF. Thus, the inherent properties of other solvents are enhanced when they are combined with GNT wherein the combination comprises at least about 25% by volume GNT.

The Table 2 results for propylene carbonate alone should be compared to the results achieved for propylene carbonate combined with 25%, 50% and 75% by volume GNT. In each case, the combination of propylene carbonate with glutaronitrile shows a more desirable leakage current over propylene carbonate per se, without a significant degradation in clear to colored spread, time to color or time to bleach. Yet, the colored to uncolored light transmission spread is still exceptional. The time to bleach is similarly superior to the performance achieved by GNT alone.

Table 2 further discloses combinations of various other solvents with glutaronitrile. Thus, beneficial combinations are seen involving GNT and ODPN, GNT and HPN and GNT and MS. In all cases, the results in terms of high and low reflectance, time to color, time to bleach and leakage current are exceptional.

Thus by using blends of glutaronitrile with other solvents, one can obtain a combined solvent with desirable attributes of both. The faster times to color and bleach of solvents such as propylene carbonate can be combined with the lower leakage current of glutaronitrile by incorporating at least about 25% of glutaronitrile in accordance with the present invention.

Prior Art Solvents

Referring to the prior art solvents, it can be seen that except for gammabutyrolactone (GBL), they all have a relatively high leakage current, i.e., in excess of 7.18 amps per square meter. While GBL has a relatively low leakage current, its low end light transmittance, i.e., transmittance when colored, is relatively high. In the electrochemichromic mirror as described, it exhibits 15.1% reflectance, as distinguished from less than 10% reflectance for electrochemichromic mirrors made using solvents of the present invention. GBL also has a relatively high vapor pressure, i.e., 3.2 mm Hg at 25° C., making vacuum backfilling difficult. Dimethylformamide (DMF) and acetonitrile (AN) performed even worse in terms of percent reflectivity when colored (i.e., 27.2% and 43% respectively).

Self-Shielding UV Stabilization

Figure 1:
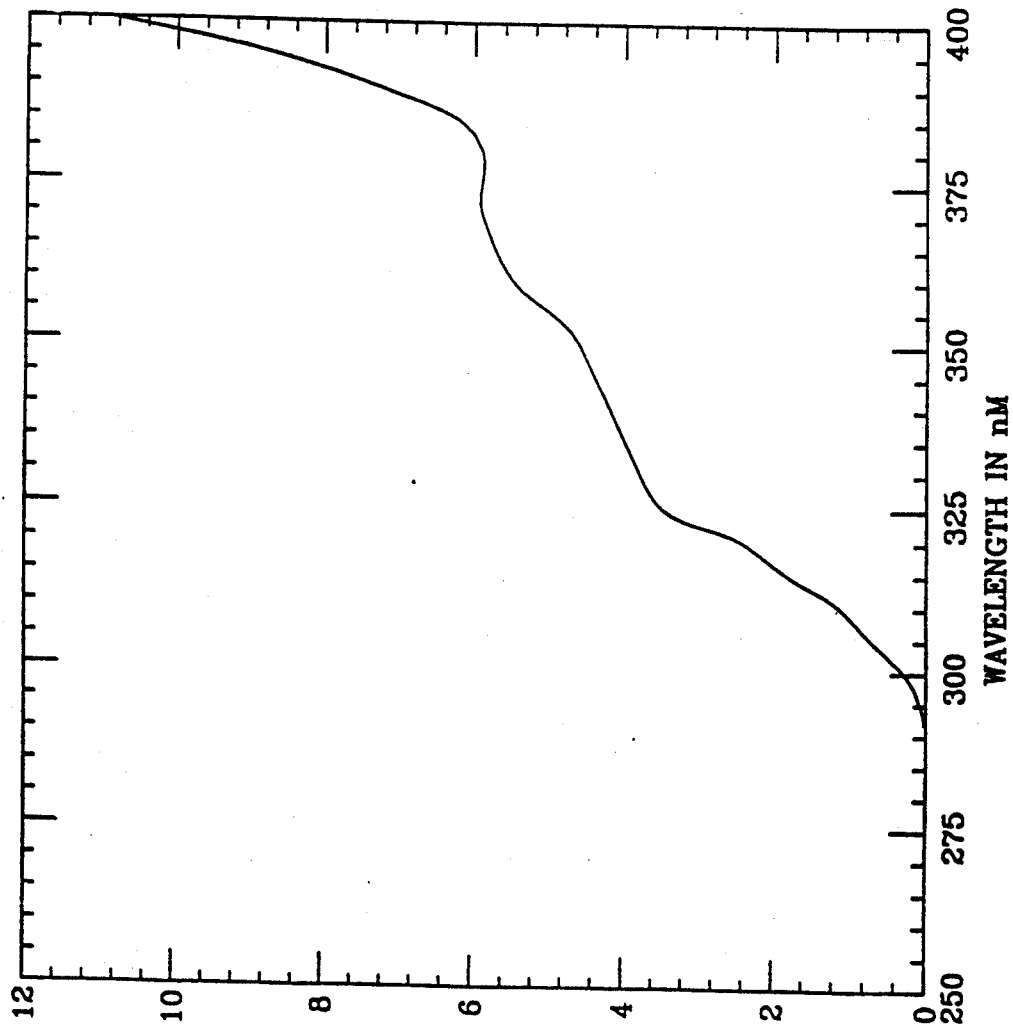
FIG. 1 is a solar spectrum in the ultraviolet region as determined in Tucson, Ariz.
Figure 3:
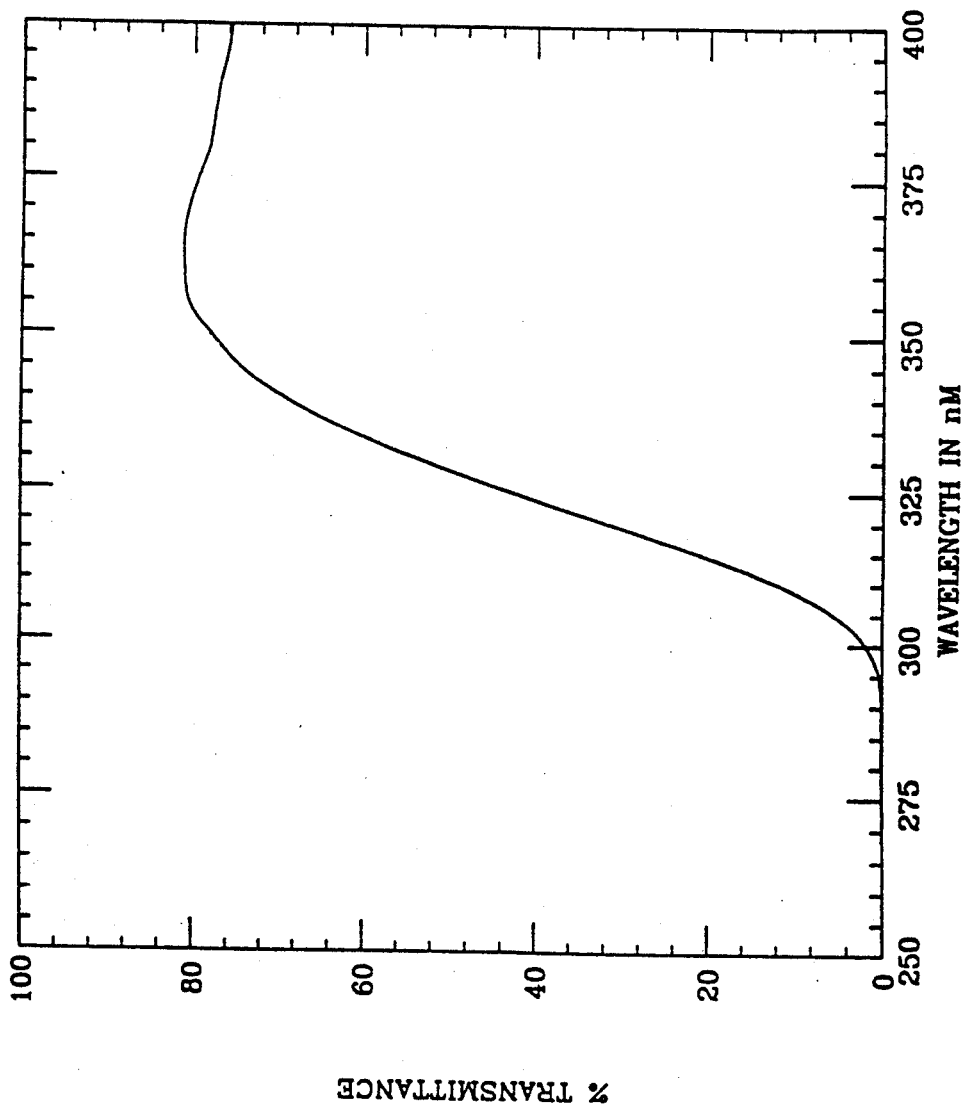
FIG. 3 is a graph of the present transmittance of solar radiation at various wavelengths through a piece of glass coated with a half wave indium tin oxide coating.
Figure 4:
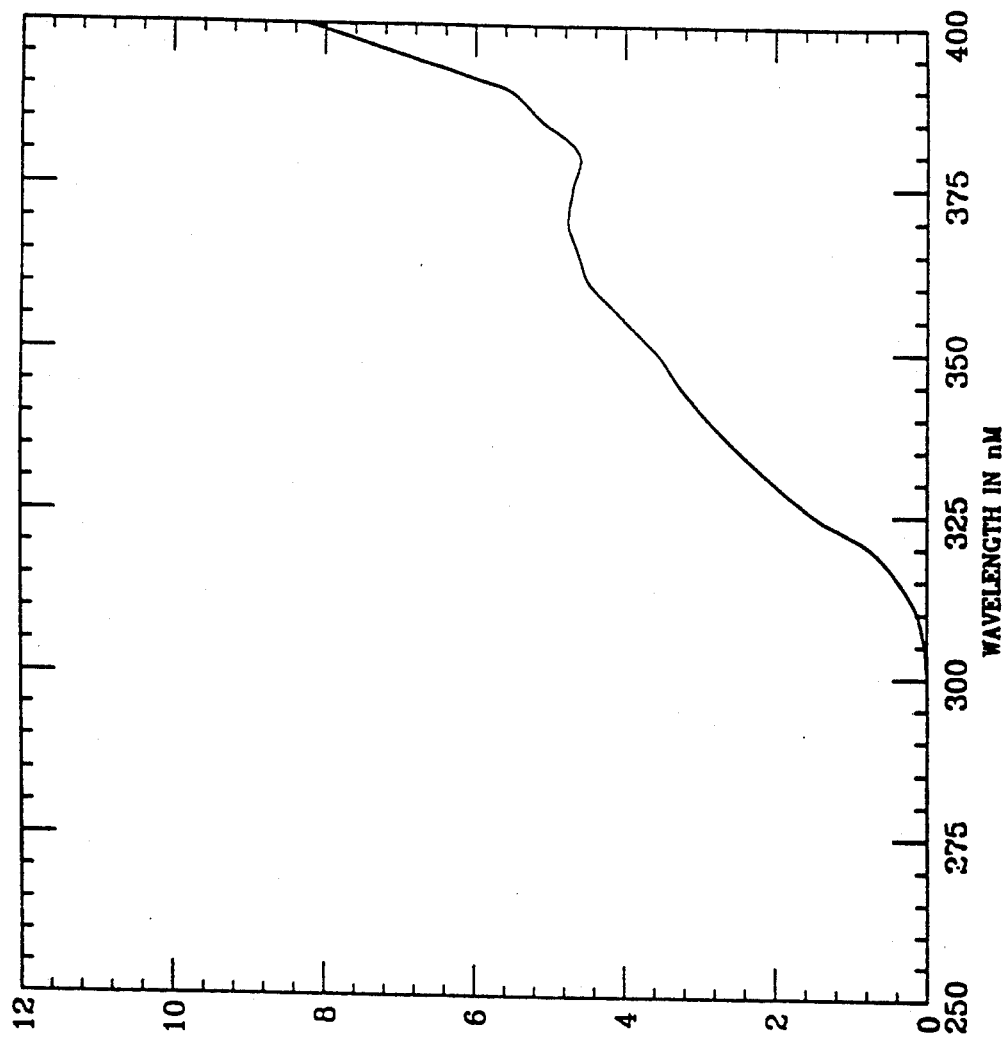
FIG. 4 is the solar spectrum passed by a piece of glass coated with half wave indium tin oxide.

The solar spectrum in the ultraviolet (UV) region incident at a desert location such as Tucson, Ariz., is shown in FIG. 1. The Y ordinate is the solar energy expressed in microwatts/cm²/100 A° band. This solar spectrum must typically pass through an ITO coated glass front piece to irradiate the solution in an electrochemichromic cell 1 as shown in FIG. 2. The transmission of ITO coated glass (0.063" sodalime coated to half wavelength thickness with 1500 A° ITO) is shown in FIG. 3. Thus the solar energy spectrum transmitted into the electrochemichromic fluid is the convolution of FIG. 1 with FIG. 3. This is shown in FIG. 4. The ITO coated glass passes about 55% of the incoming UV solar energy in the 250 to 350 nm region. Thus a substantial portion of the solar UV is unattenuated by the ITO coated glass front piece. This UV radiation passes into the electrochemichromic fluid where it irradiates the electrochemichromic species dissolved therein.

Figure 5:
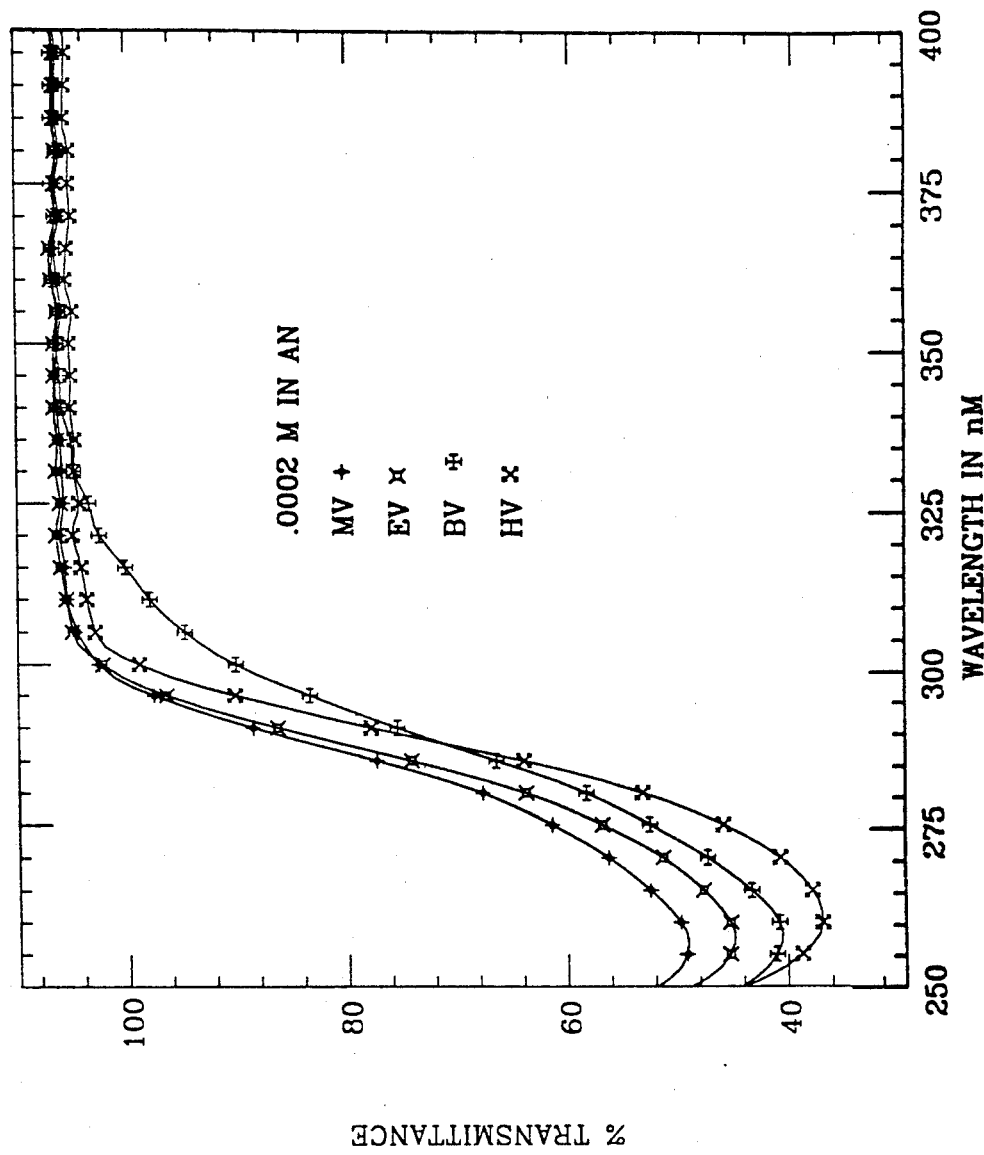
FIG. 5 is a graph of the percent transmittance of solar radiation at various wavelengths for 0.0002 molar acetonitrile solutions of various cathodic compounds typically used in electrochemichromic cells.
Figure 6:
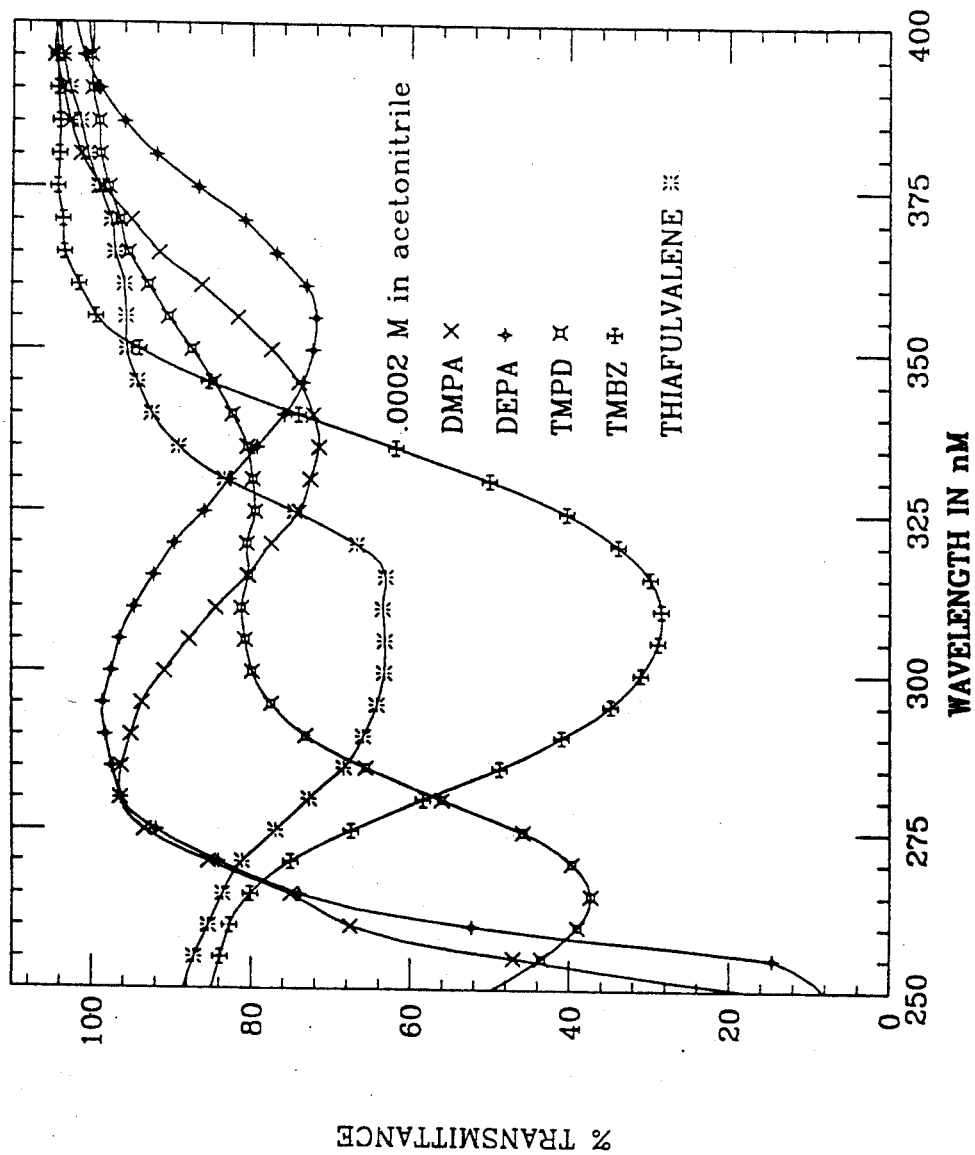
FIG. 6 is a graph of the percent transmittance of solar radiation at various wavelengths by 0.0002 molar acetonitrile solutions of various anodic compounds used in electrochemichromic cells.

As shown in FIG. 5, the cathodically coloring species most commonly used in prior art literature such as methylviologen (MV), ethylviologen (EV), benzylviologen (BV), and heptylviologen (HV) have an absorption peak below 295 nm and thus should be largely nonabsorbing to the solar UV transmitted into the electrochemichromic cell. However, as shown in FIG. 6, anodic compounds, such as 5,10-dimethyl-5,10-dihydrophenazine (DMPA), 5,10-diethyl-5,10-dihydrophenazine (DEPA), tetramethylphenylenediamine (TMPD), tetramethylbenzidine (TMBZ) and tetrathiafulvalene (TTF) have substantial UV absorbance in the 250 to 350 nm region. For example, DMPA in 0.0002M solution in acetonitrile (AN) and in a 1 mm path length quartz cell absorbs about 22% of the UV solar spectrum passed by ITO coated glass in the 250 to 350 nm region.

Figure 7:
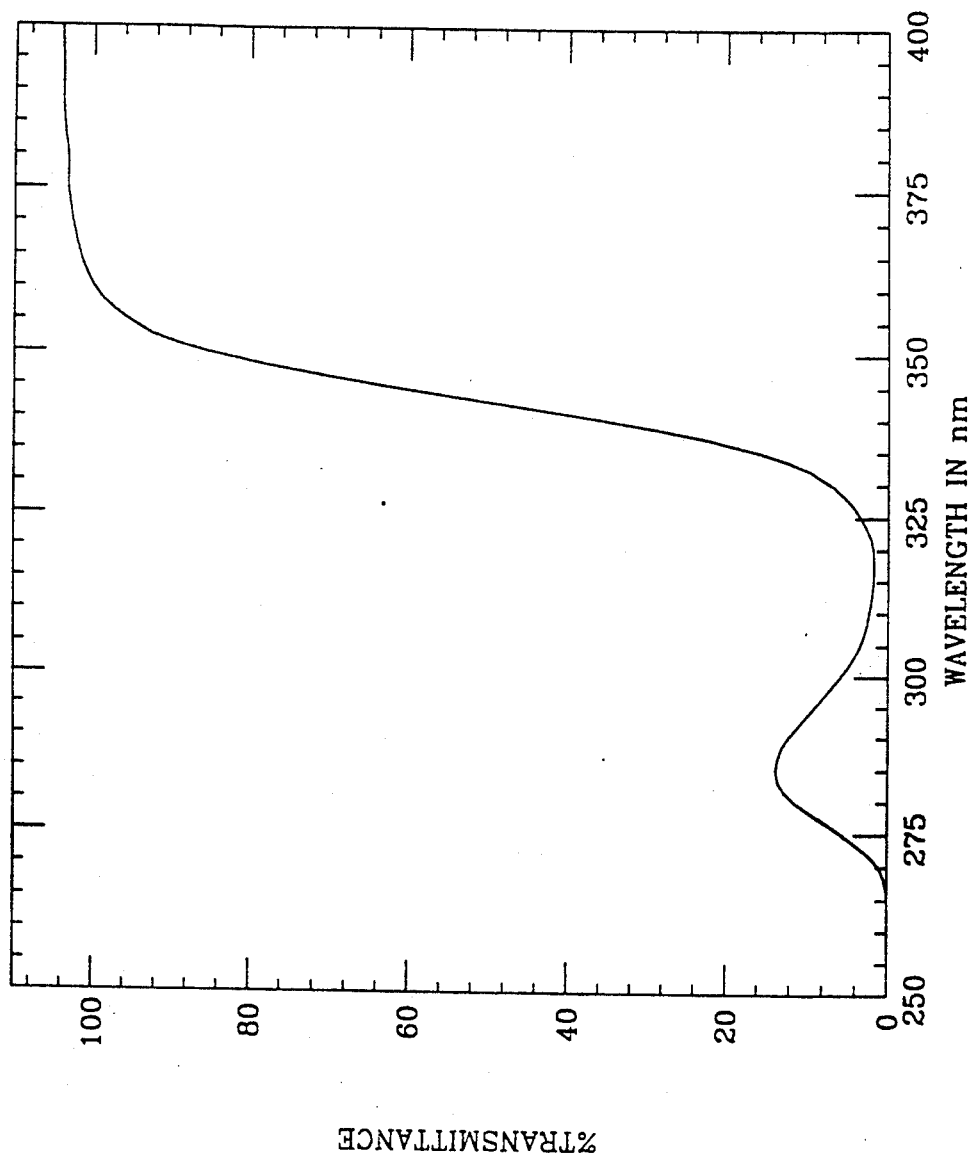
FIG. 7 is a graph of the percent transmittance of solar radiation at various wavelengths by the solvent GNT.

Thus, it is desirable to shield the electrochemichromic compounds from UV irradiation in this region. One aspect of the present invention involves the use of glutaronitrile as a solvent which self-screens solutes dissolved therein from the detrimental effects of UV radiation impinging thereon. Specifically, we have surprisingly found the glutaronitrile, when used in a one millimeter path length, transmits no more than about 40% of the solar radiation in the 250 to 350 nm range passed through a typical transparent ITO coated glass substrate. Such a substrate would typically be dosa lime glass of approximately 0.063 inch thickness, coated with a half wave (1500° A) ITO transparent conductive layer. Thus the glutaronitrile, in addition to acting as solvent for electrochemichromic compounds such that the resulting electrochemichromic solution cycles well from a high transmitting state to a low transmitting state, has the additional beneficial property of self-absorbing substantial proportions of the UV solar insolution in the 250 to 350 nm region. FIG. 7 shows the transmission in this region of glutaronitrile (GNT). The spectrum is taken in a 1 mm pathlength quartz cell. This 1 mm cell filled with GNT transmits from 250 nm to 350 nm only about 40% of the solar radiation passed by half wave (1500° A) ITO coated standard soda lime glass of a thickness of about 0.063 inches. This data can be compared to FIG. 8, which shows the UV transmission, in a 1 mm pathlength cell, for various solvents proposed in prior art for use in electrochemichromic solutions. Note that these are mostly completely transmitting in the ultraviolet region in that they absorb very little between 250 nm to 350 nm. For example, propylene carbonate in a 1 mm cell transmits about 87% of the solar energy passed through ITO coated glass between 250 nm and 350 nm; diemthylformamide (DMF) about 89%, acetonitrile (AN) about 100%; and methyl ethyl ketone (MEK) about 93%. Thus, GNT helps extend the UV lifetime of electrochemichromic solutions by shielding the UV fragile electrochemichromic compounds that are solutes in the UV self-screening solvent.

Self-screening by the solvent is more effective than screening with a UV inhibiting solute because the solvent is by far the majority component in the solution. For example in a 0.025M solution in GNT, the molarity of the solute is 0.025M while the molarity of the solvent is 10.51M so that there are roughly 420 solvent molecules for every solute molecule in solution. Thus, the probability is greatest that an incoming UV photon may impinge and be absorbed by a solvent molecule (which typically is UV resilient), rather than impinge and be absorbed by a solute molecule (which, in the case of electrochemichromic species, is usually UV fragile and degraded by UV irradiation).

Although addition of UV stabilizers such as benzotriazoles, benzophenones, or hindered amine complexes, as known in prior art, can help increase solution stability to UV radiation, there are limitations and disadvantages to addition of UV stabilizers. Because they are held in solutions of low to moderate viscosity, both the UV stabilizer and the electrochemichromic solution species it is intended to stabilize are free to randomly move about in the solution. Thus, an incoming photon of UV radiation may impinge and thus degrade an electrochemichromic solute species rather than a UV absorber in solution.

Also, solvent solubility places limits on the amount of UV stabilizer that can be added. Since UV stabilizers typically have molecular weights in the 250 to 400 range, the molarity of UV stabilizer in solution is typically around 0.2M or less if the stabilizer concentration is 5% wt/volume. Thus UV stabilizers outnumber solute by about 10 to 1 but the solvent outnumbers solute by about 400 to 1 and thus the inherent self-screening achievable by the solvent GNT, working in conjunction with dissolved stabilizer, can help enhance the UV stability of electrochemichromic devices that use the UV self-screening solvent GNT.

ADDITIONAL EXAMPLES

The following examples further illustrate the important and unexpected advantages of the solutions of the present invention over the prior art:

EXAMPLE 1

Prior Art DMF

A self-erasing electrochemichromic cell solution was prepared based on the prior art of Shelepin, as taught in *Elektrokhimya*, 13(3), 404-408 (March 1977). This consisted of:

0.05M Methylviologen perchlorate
0.05M 5,10-dihydro-5,10-dimethylphenazine
10% weight/volume polymethylmethacrylate (90,000 average molecular weight) dissolved in dimethylformamide (DMF).

In addition, 0.05M tetraethylammonium perchlorate was added as inert current carrying electrolyte as taught in Manos U.S. Pat. No. 3,451,741 (Jun. 24, 1969).

The solution was prepared under oxygen-free conditions and anhydrous argon gas was bubbled through the solution to further deoxygenate the solution. A roughly 23 cm×5.6 cm rectangular cell was fabricated according to the construction shown in FIG. 2. The cell cavity was formed by silk-screening a roughly 2 mm×150 micron epoxy seal around the edge perimeter of one of the ITO transparent conductive coated glass substrates shown in FIG. 2. Sheet resistance for the ITO transparent conducting coating used on both substrates was about 15 ohms/square. Prior to its silk-screening, glass beads of nominal diameter 150 microns were mixed with the epoxy. Before curing of the epoxy, the second ITO coated glass substrate was contacted to the epoxy seal and the now laminated construction was baked in an oven to cure the epoxy. A small gap of approximately 2 mm×1 mm×150 micron dimension had been allowed in the epoxy seal so that, upon lamination, a small fill hole was available close to one corner of the seal through which fluid could flow during the vacuum backfilling process. Attempts at room temperature to vacuum backfill this solution failed. When vacuum was applied, the DMF-based solution boiled and could not be filled into the cell cavity.

With this prior art solution, two fill holes were drilled through the face of one of the ITO coated glass substrates so that fluid could be filled into the cell cavity using suction at one hole to pull solution from a syringe tightly held to the other hole. Each hole was of approximately 1 mm diameter. For this construction, no fill hole was allowed in the epoxy seal.

After the DMF-based electrochemichromic solution described above was filled into the cell cavity using suction pull through from a syringe, the holes drilled through the glass substrate were plugged with epoxy. Using this nonvacuum backfilling technique, the prior art DMF solution could be successfully filled into the cell cavity. This filling technique, although practical at a laboratory or prototype level, has disadvantages for commercial devices which include difficulties in securely plugging the relatively large fill holes drilled through the glass substrate.

Consistent with prior art teachings, electrochemichromic windows and mirrors, produced as described above and using the DMF-based formulation from prior art, were found to have the variable transmission (or variable reflection in the case of mirrors), cycle lifetime and coloration efficiency required to render single-compartment, self-erasing, solution-phase electrochemichromic devices commercially practical.

For example, a roughly 129 cm$^2$ window was constructed of dimension 23 cm×5.6 cm×150 microns cell thickness. When filled with the prior art DMF-based formulation, and where a silver mirror reflector was placed behind this window, the reflectance from the mirror, which initially was 81.3%R, dimmed rapidly to about 27.2%R as measured at the center of the rectangular device.

To dim the mirror reflectance, a potential of 1 volt was applied to bus bars that run lengthwise along the outer perimeter of the ITO coated transparent substrates that sandwiched the DMF-based electrochemichromic solution. Upon removing the applied potential, the electrochemichromic solution self-erased back to a clear state so that the mirror reflectance retuned to 81.3%R. Alternatively, the cell could be more rapidly bleached by shorting the electrodes. Cycle lifetime was established by applying 1 volt potential across the electrochemichromic solution for 30 seconds to dim the transmission, followed by shorting the cell electrodes for 30 seconds to bleach back to the clear state. This color for 30 seconds followed by bleach for 30 seconds cycle was continued for over 10,000 cycles. Coloring efficiency was maintained; the clear state reflectivity remained high while the cell continued to dim in its center to about 27%R.

However, there are three significant disadvantages to using this prior art DMF-based formulation for commercial applications. The large leakage current which was in excess of 8A/m$^2$ would lead to undesirable power drain in practical devices and particularly in large area window or mirror devices. Also, although coloration was efficient as seen by the deep coloration close to the bus bars, coloration was very nonuniform, even for this relatively small window of 129 cm$^2$ area. Also, although thickener was added as suggested by prior art to limit segregation, segregation was nevertheless present even after relatively modest prolonged coloration. For these reasons, coupled with the impracticality of using vacuum backfilling, this prior art DMF-based solution was seen to be inferior to mirror and window devices made possible by the solutions of this present invention.

EXAMPLE 2

(GNT Solution)

A self-erasing electrochemichromic solution was formed of:
0.025M Methylviologen perchlorate
0.025M 5,10-dihydro-5,10-dimethylphenazine
0.025M Tetraethylammonium perchlorate
5% weight/volume 2,4-dihydroxy-benzophenone (UV stabilizer "Uvinul 400 ™") dissolved in glutaronitrile (GNT).

This solution was filled using vacuum backfilling into an interior rearview mirror shaped window constructed as per FIG. 2 of length about 24 cm and width about 5 cm, and of cell area about 110 cm$^2$. The ionterpane gap was 150 microns. Glass coated with ITO of sheet resistance 15 ohms/square and greater than 85% visible transmittance was used. A silver mirror surface reflector was placed behind the window. Without any applied voltage, the cell was clear and colorless and the reflectance from the mirror was about 78.5%R. When 1 volt potential was applied across the cell, reflectance of the mirror was reduced to 7.1%R, as measured at the center of the window device. Color transition time from 70%R to 20%R was 3.5 seconds. When the electrodes were shorted, bleach time from 10%R to 60%R was greater than 10 seconds. Coloration was both efficient and satisfactorily uniform. Leakage current was about 3.59 A/m$^2$.

After prolonged colored for 30 minutes, segregation performance as evidenced by a blue band adjacent to the cathodically powered bus bar and a yellow/brown band adjacent to the anodically colored bus bar was small. Segregation performance and uniformity were greatly improved over that seen in Example 1, even though no additional thickening agents such as are taught to be necessary in Shelepin, supra Example 1, and in Bykar European Patent Publication 240,226 were used. Nor was the use of a high concentration of current-carrying salt necessary, such as is taught to be necessary for commercial practicality of the solutions taught in Byker European Patent Publication 240,226.

The GNT-based formulation has the coloring efficiency and uniformity required to be commercially practical and it showed unexpectedly excellent cycle lifetime. Cells fabricated as described in this example have been cycled in excess of 100,000 cycles without any significant deterioration in the performance described above. Each cycle consists of 30 seconds color at 1 V applied, and 30 seconds bleach at 0 V applied, i.e., with the electrodes shorted. The cell is undamaged when subjected to prolonged coloration. Performance is maintained after baking at 85° C. for two weeks. Cells are not damaged by prolonged storage at low temperatures of −20° C. or lower. The formulation described here is sufficiently UV stable, at least for use in the interior cabin of an automobile. The low leakage current discovered in GNT solutions makes this formula particularly well suited for use in large area windows and mirrors where voltage drops across transparent conductors due to excessive leakage currents leading to undesirable and commercially impractical nonuniform coloration along with excessive segregation.

EXAMPLE 3

(HPN/GNT)

A self-erasing electrochemichromic solution was formulated as described in Example 2, but using a 50%:50% volume by-volume mixture of glutaronitrile (GNT) and 3-hydroxypropionitrile (HPN) as the solvent. When filled into a cell as described in Example 2, and with a silver mirror reflector placed behind the window, mirror reflectance was 80.2%R in the clear state, which dimmed to 6.6%R when 1 volt was applied. Color time to dim from 70%R to 20%R was 3.78 seconds. Leakage current was about 5.77 A/m$^2$. Bleach time from 10%R to 60%R was 5.7 seconds and thus was adequate for an automotive rearview mirror application, and very acceptable in a window application. Coloring efficiency and coloring uniformity were excellent, as was segregation performance which was exceptionally good. Cells formulated according to this example have excellent cycle lifetime with in excess of 60,000 30 second color; 30 second bleach cycles tested without any significant deterioration in performance. The high temperature, low temperature, and UV performance for this solution are similar to that reported above in Example 2.

EXAMPLE 4

(GNT With ODPN, MS)

Solutions were formulated, and devices fabricated and tested as described in Example 2, but using a 50%:50% volume by volume mixture of 3,3'-oxydipropionitrile (ODPN) and GNT as the solvent. Excellent cycle lifetime, coloring efficiency, coloring uniformity, high temperature, low temperature, and ultraviolet performance was achieved. Likewise, excellent performance was recorded with GNT combined with 3-methylsulfolane in a 50%:50% volume by volume mixture.

EXAMPLE 5

(Ethylviologen in HPN/GNT)

A self-erasing, electrochemichromic solution was formulated comprising:

0.025M ethylviologen perchlorate
0.025M 5,10-dihydro-5,10-dimethylphenazine
0.025M Tetraethylammonium perchlorate
10% weight/volume 2,4-dihydroxy-benzophenone (UV stabilizer Unvil 400 TM dissolved in a 50:50 hydroxypropionitrile (HPN)/glutaronitrile (GNT) mixture.

When filled into a 24 cm×5 cm×150 micron cell, as described in Example 2, a silver mirror reflector placed behind the window so formed had a reflectivity of 80.3%R which dimmed to 6.5%R when 1 volt was applied across the ITO transparent conductors (of 15 ohms/square sheet resistance) used. Coloration was rapid (3.5 sec) and bleach response was satisfactory. Excellent coloration efficiency and coloration uniformity were maintained after cycle lifetime testing; each cycle consisting of 1 volt applied for 30 seconds, followed by 0 V applied for 30 seconds.

EXAMPLE 6

(GNT-Variable Transmission)

A window was formed as described in Example 2 consisting of:

0.025M Methylviologen perchlorate
0.025M 5,10-dihydro-5,10-dimethylphenazine
0.025M Tetraethylammonium perchlorate in a 50:50 mixture of glutaronitrile (GNT) and 3-hydroxyproprionitrile (HPN).

This cell was powered at various voltages from 0 V to 1.2 V. The transmission at the center of this window, at various applied voltages, is shown in Table 4.

TABLE 4

| Applied Voltage Volts | % Transmission |
|---|---|
| 0 V | 80.7 |
| 0.2 V | 80.7 |
| 0.6 V | 44.9 |
| 0.7 V | 28.9 |
| 0.8 V | 18.3 |
| 0.9 V | 12.2 |
| 1.0 V | 7.9 |
| 1.1 V | 7.0 |
| 1.2 V | 6.8 |

As can be seen from the Table, % transmission can be varied between 80.7%T and 6.8%R by appropriately selecting the applied voltage. This ability to operate as a grey scale was found in all the novel solvent mixtures disclosed in this invention, and is consistent with prior art teachings and with the intrinsic properties of the electrochemichromic species themselves.

EXAMPLE 7

(Commercial Cell Comparison)

The practical benefit of these concepts can be illustrated by comparing the UV stability of a rearview mirror fabricated using the concepts of this invention to the UV stability of a commercially available electrochemichromic rearview mirror. The particular commercially available electrochemichromic mirror tested was an interior rearview mirror purchased from General Motors spare parts around July 1989 and it was marked #81091B on its rear surface. Analysis of these commercially available mirrors shows that their solutions contain benzylviologen (BV) and 5,10-dihydro-5,10-dimethylphenazine (DMPA) in propylene carbonate and also contain a benzothriazole UV stabilizer. Our electrochemichromic rearview mirror consisted of: 0.025M methylviologen perchlorate; 0.025M 5,10-dihydro-5,10-dimethylphenazine; 0.025M tetraethylammonium perchlorate; 5% by weight 2,4'-dihydroxy-benzophenone (Uvinul 400 TM) as UV stabilizer all dissolved in 50% HPN:50% GNT. Both mirrors were exposed to a xenon arc lamp and were irradiated with UV radiation that closely simulated the solar UV intensity. The commercially available ECCM was irradiated for 240 hours. The HPN/GNT solution of this present invention was irradiated for 310 hours. The integrated intensity from 250 nm to 400 nm was around 70 watts/M$^2$. Results were:

| | HI % R | LOW % R | Color 70%–20% R Sec | Bleach 10%–60% R Sec |
|---|---|---|---|---|
| Initially | | | | |
| Commercially Available ECCM | 81.3 | 6.2 | 3 | 6 |
| HPN/GNT 50/50 | 80.4 | 7.1 | 4 | 7.5 |
| 240 Hours UV Exposure | | | | |
| Commercially Available | 54.1 | 15 | 6* | 9** |

-continued

|  | HI % R | LOW % R | Color 70%- 20% R Sec | Bleach 10%- 60% R Sec |
|---|---|---|---|---|
| ECCM 310 Hours UV Exposure | | | | |
| HPN/GNT 50/50 | 81.3 | 7.2 | 3 | 4.5 |

*54.1% R to 20% R
**15% R to 54.1% R

The formulations in accordance with the present invention performed remarkably better than the commercially available formulation in that they maintained their high reflectance state of about 80%R, whereas the commercial produce dropped its zero potential reflection to only about 54%R, principally due to its yellowing.

Of course, it is understood that the above is merely a preferred embodiment of the invention and that various changes and alterations can be made without departing from the spirit and broader aspects thereof as set forth in the appended claims.

The embodiments of the invention in which an exclusive property or privilege is claimed are defined as follows:

1. A method for reducing leakage current and enhancing UV stability/in an electrochimichromic cell having spaced plates, each having an inwardly facing conductive surface, and a solution located in said cell between said plates, said solution comprising a redox chemical pair which colors in the presence of an applied voltage and which bleaches to a colorless condition in the absence of an applied voltage said method comprising:
    using a solvent for said redox chemical pair comprising at least 25% by volume glutaronitrile.

2. The method of claim 1 which additionally includes introducing an electrolyte into said solution.

3. A method for reducing leakage current and enhancing UV stability in an electrochromichromic cell having spaced plates, each having an inwardly facing conductive surface, and a solution located in said cell between said plates, said solution comprising a redox chemical pair which colors in the presence of an applied voltage and which bleaches to a colorless condition in the absence of an applied voltage, said method comprising:
    using a solvent for said redox chemical pair comprising glutaronitrile and 3-methylsulfolane in a ratio by volume of from about 75:25 to about 25:75.

4. A method for reducing leakage current and enhancing UV stability in an electrochromichromic cell having spaced plates, each having an inwardly facing conductive surface, and a solution located in said cell between said plates, said solution comprising a redox chemical pair which colors in the presence of an applied voltage and which bleaches to a colorless condition in the absence of an applied voltage, said method comprising:
    using a solvent for said redox chemical pair comprising glutaronitrile and 3,3'-oxydipropionitrile in a ratio by volume of from about 75:25 to about 25:75.

5. A method for reducing leakage current and enhancing UV stability in an electrochromichromic cell having spaced plates, each having an inwardly facing conductive surface, and a solution located in said cell between said plates, said solution comprising a redox chemical pair which colors in the presence of an applied voltage and which bleaches to a colorless condition in the absence of an applied voltage, said method comprising:
    using a solvent for said redox chemical pair comprising glutaronitrile and 3-hydroxypropionitrile in a ratio by volume of from about 75:25 to about 25:75.

6. A method for reducing leakage current and enhancing UV stability in an electrochromichromic cell having spaced plates, each having an inwardly facing conductive surface, and a solution located in said cell between said plates, said solution comprising a redox chemical pair which colors in the presence of an applied voltage and which bleaches to a colorless condition in the absence of an applied voltage, said method comprising:
    using a solvent for said redox chemical pair comprising propylene carbonate and glutaronitrile in a ratio by volume of from about 75:25 to about 25:75.

7. A method for reducing leakage current and enhancing UV stability in an electrochromichromic cell having spaced plates, each having an inwardly facing conductive surface, and a solution located in said cell between said plates, said solution comprising a redox chemical pair which colors in the presence of an applied voltage and which bleaches to a colorless condition in the absence of an applied voltage, said redox pair comprising a cathodic material selected from the group consisting of one of methyl, ethyl, benzyl and heptylviologen or mixtures thereof, with a counterion selected from the group consisting of one of perchlorate, tetrafluoroborate, trifluoromethanesulfonate, hexafluorophosphate, hexafluoroarsenate and mixtures thereof and an anodic material selected from the group consisting of:
    DMPA—5,10-dihydro-5,10-dimethylphenazine,
    DEPA—5,10-dihydro-5,10-diethylphenazine,
    DOPA—5,10-dihydro-5,10-dioctylphenazine,
    TMPD—N,N,N',N'-tetramethylphenylenediamine,
    TMBZ—N,N,N',N'-tetramethylbenzidine,
    TTF—Tetrathiafulvalene and mixtures thereof,
said method comprising:
    using a solvent for said redox chemical pair comprising at least 25% by volume glutaronitrile.

8. The electrochromichromic solution of claim 7 in which said anodic and cathodic materials are employed at from about 0.02 to about 0.05 molar concentrations.

9. A method for reducing leakage current and enhancing UV stability in an electrochromichromic cell having spaced plates, each having an inwardly facing conductive surface, and a solution located in said cell between said plates, said solution comprising a redox chemical pair which colors in the presence of an applied voltage and which bleaches to a colorless condition in the absence of an applied voltage, said redox pair comprising a cathodic material and an anodic material, said cathodic material consisting of one of methyl and ethylviologen and mixtures thereof, using one of hexafluorophosphate, hexafluoroarsenate and mixtures thereof as counterion, and said anodic material is 5,10-dihydro-5,10-dimethylphenazine, said method comprising: using a solvent for said redox chemical pair comprising at least 25% by volume glutaronitrile.

10. The electrochromichromic solution of claim 9 in which said anodic and cathodic materials are employed at 0.025 molar concentration.

11. An electrochromichromic cell comprising:

spaced plates, each having an inwardly facing conductive surface;
an electrochemichromic solution in said cell, between said spaced plates, said solution comprising:
solvent;
a redox chemical pair in solution in said solvent which colors in the presence of an applied voltage and which bleaches to a colorless condition in the absence of an applied voltage;
said solvent including at least 25% by volume of glutaronitrile.

12. The electrochemichromic cell of claim 11 in which said electrochemichromic solution additionally includes an electrolyte in solution in said solvent.

13. An electrochemichromic cell comprising:
spaced plates, each having an inwardly facing conductive surface;
an electrochemichromic solution in said cell, between said spaced plates, said solution comprising:
solvent; and
a redox chemical pair in solution in said solvent which colors in the presence of an applied voltage and which bleaches to a colorless condition in the absence of an applied voltage;
said solvent including glutaronitrile and 3-methylsulfolane in a ratio by volume of from about 75:25 to about 25:75.

14. An electrochemichromic cell comprising:
spaced plates, each having an inwardly facing conductive surface;
an electrochemichromic solution in said cell, between said spaced plates, said solution comprising:
solvent; and
a redox chemical pair in solution in said solvent which colors in the presence of an applied voltage and which bleaches to a colorless condition in the absence of an applied voltage;
said solvent including glutaronitrile and 3,3'-oxydipropionitrile in a ratio by volume of from about 75:25 to about 25:75.

15. An electrochemichromic cell comprising:
spaced plates, each having an inwardly facing conductive surface;
an electrochemichromic solution in said cell, between said spaced plates, said solution comprising:
solvent; and
a redox chemical pair in solution in said solvent which colors in the presence of an applied voltage and which bleaches to a colorless condition in the absence of an applied voltage;
said solvent including glutaronitrile and 3,3'-oxydipropionitrile in a ratio by volume of from about 75:25 to about 25:75.

16. An electrochemichromic cell comprising:
spaced plates, each having an inwardly facing conductive surface;
an electrochemichromic solution in said cell, between said spaced plates, said solution comprising:
solvent; and
a redox chemical pair in solution in said solvent which colors in the presence of an applied voltage and which bleaches to a colorless condition in the absence of an applied voltage;
said solvent including 3-hydroxypropionitrile and glutaronitrile in a ratio by volume of from about 75:25 to about 25:75.

17. An electrochemichromic cell comprising:
spaced plates, each having an inwardly facing conductive surface;
an electrochemichromic solution in said cell, between said spaced plates, said solution comprising:
solvent; and
a redox chemical pair in solution in said solvent which colors in the presence of an applied voltage and which bleaches to a colorless condition in the absence of an applied voltage, said redox pair comprising a cathodic material selected from the group consisting of one of methyl, ethyl, benzyl and heptylviologen or mixtures thereof, with a counterion selected from the group consisting of one of perchlorate, tetrafluoroborate, trifluoromethanesulfonate, hexafluorophosphate, hexafluoroarsenate and mixtures thereof and an anodic material selected from the group consisting of:
DMPA—5,10-dihydro-5,10-dimethylphenazine,
DEPA—5,10-dihydro-5,10-diethylphenazine,
DOPA—5,10-dihydro-5,10-dioctylphenazine,
TMPD—N,N,N',N'-tetramethylphenylenediamine,
TMBZ—N,N,N',N'-tetramethylbenzidine,
TTF—Tetrathiafulvalene and mixtures thereof,
said solvent including at least 25% by volume of glutaronitrile.

18. The electrochemichromic solution of claim 17 in which said anodic and cathodic materials are employed at from about 0.02 to about 0.05 molar concentrations.

19. An electrochemichromic cell comprising:
spaced plates, each having an inwardly facing conductive surface;
an electrochemichromic solution in said cell, between said spaced plates, said solution comprising:
solvent; and
a redox chemical pair in solution in said solvent which colors in the presence of an applied voltage and which bleaches to a colorless condition in the absence of an applied voltage, said redox pair including a cathodic material and an anodic material, said cathodic material consisting of one of methyl and ethylviologen and mixtures thereof, using one of hexafluorophosphate, hexafluoroarsenate and mixtures thereof as counterion, and said anodic material is 5,10-dihydro-5,10-dimethylphenazine,
said solvent including at least 25% by volume of glutaronitrile.

20. The electrochemichromic solution of claim 19 in which said anodic and cathodic materials are employed at 0.025 molar concentration.

21. A method for filling an electrochemichromic cell having relatively closely spaced plates, each having an inwardly facing conductive surface, said spaced plates being sealed around the periphery by a seal, said filling method comprising:
introducing a small gap int said seal of an empty cell;
placing said cell in a chamber along with a container of an electrochemichromic solution and evacuating said chamber;
lowering said cell into said container of electrochemichromic solution such that said gap is located under the surface of the electrochemichromic solution which solution comprises a solvent, a redox chemical pair in solution in said solvent which colors in the presence of an applied voltage and which bleaches to a colorless condition in the absence of an applied voltage, said solvent including at least 25% by volume of glutaronitrile;

said peripheral seal enclosing an area of each of said plates;

said solvent having a vapor pressure such that said vapor pressure, expressed in units of millimeters of mercury, multiplied by said area, expressed in units of square centimeters, is less than 5.969;

exposing said electrochemichromic solution to a source of inert gas of pressure greater than that in said cell to thereby cause said solution to flow into said cell;

sealing said gap in said peripheral seal of said cell.

22. The method of claim 21 in which said exposing step comprises subsequently venting said chamber to atmospheric pressure;

said method also including removing said cell from said container prior to said sealing step.

23. The method of claim 22 in which said vacuum chamber is pressurized to above atmospheric pressure after it has been vented to atmospheric pressure.

24. The method of claim 23 in which said electrochemichromic solution is cooled prior to backfilling to reduce its vapor pressure.

25. The method of claim 22 in which said electrochemichromic solution is cooled prior to backfilling to reduce its vapor pressure.

26. The method of claim 21 in which said solvent comprises: glutaronitrile and 3-methylsulfolane in a ratio by volume of from about 75:25 to about 25:75.

27. The method of claim 21 in which said solvent comprises: glutarontrile and 3,3'-oxydipropionitrile in a ratio by volume of from about 75:25 to about 25:75.

28. The method of claim 21 in which said solvent comprises: glutaronitrile and 3-hydroxypropionitrile in a ratio by volume of from about 75:25 to about 25:75.

29. The method of claim 21 in which said solvent comprises: propylene carbonate and glutaronitrile in a ratio by volume of from about 75:25 to about 25:75.

30. The method of claim 21 in which said inert gas is nitrogen.

31. The method of claim 21 in which said area of said enclosed plates is at least 110 cm$^2$.

* * * * *

UNITED STATES PATENT AND TRADEMARK OFFICE
CERTIFICATE OF CORRECTION

PATENT NO. : 5,151,816

DATED : September 29, 1992

INVENTOR(S) : Desaraju V. Varaprasad et al.

It is certified that error appears in the above-identified patent and that said Letters Patent is hereby corrected as shown below:

Column 4, line 43:
"present" should be --percent--.

Column 5, line 68:
"enhances" should be --enhance--.

Column 6, line 33:
Before "forth below:" insert --The preferred anodic coloring materials are set--.

Column 6, line 65:
"dimetylphenazine" should be --dimethylphenazine--.

Column 7, line 50:
"1" should be --1 mm--.

Column 8, line 51:
"interpene" should be --interpane--.

Column 9, line 41:
"land" should be --1 and--.

Column 11, line 65:
After "are" insert --not prior art, but rather are the subject of a copending--.

Column 13, line 24:
"dosa" should be --soda--.

UNITED STATES PATENT AND TRADEMARK OFFICE
CERTIFICATE OF CORRECTION

PATENT NO. : 5,151,816

DATED : September 29, 1992

INVENTOR(S) : Desaraju V. Varaprasad et al.

It is certified that error appears in the above-identified patent and that said Letters Patent is hereby corrected as shown below:

Column 15, line 36:
"run" should be --ran--.

Column 16, line 18:
"ionterpane" should be --interpane--.

Column 16, line 21:
After "mirror" delete --surface--.

Column 16, line 53:
"consist" should be --consisted--.

Column 18, line 22, "6.8% R" should read --6,8% T--.

Column 22, claim 21, line 56, "int" should read --into--.

Signed and Sealed this

Eighteenth Day of January, 1994

Attest:

BRUCE LEHMAN

*Attesting Officer*     *Commissioner of Patents and Trademarks*